United States Patent [19]

Iden

[11] Patent Number: 4,667,518

[45] Date of Patent: May 26, 1987

[54] SENSOR CIRCUIT

[75] Inventor: Lee J. Iden, Morristown, N.J.

[73] Assignee: Iden Industries, Inc., Millington, N.J.

[21] Appl. No.: 840,874

[22] Filed: Mar. 18, 1986

[51] Int. Cl.[4] .............................................. G01M 9/02
[52] U.S. Cl. ....................................... 73/753; 29/620; 73/719; 73/725; 338/162; 338/307
[58] Field of Search ........................ 73/719, 725, 753; 338/195, 176, 180, 202, 174, 163, 142, 292, 307, 308, 309, 314, 306, 320, 171, 137, 167, 162, 184; 29/620; 219/121 LH, 121 LG

[56] References Cited

U.S. PATENT DOCUMENTS

| 3,936,568 | 2/1976 | Pukaite | 338/162 |
| 4,051,550 | 9/1977 | Seno et al. | 361/402 |
| 4,345,235 | 8/1982 | Riley et al. | 338/195 |
| 4,439,754 | 3/1984 | Madden, Jr. | 219/121 LH |

Primary Examiner—Donald O. Woodiel
Attorney, Agent, or Firm—Thomas D. Hoffman; Gerald S. Rosen

[57] ABSTRACT

A high density miniature sensor circuit useful for measuring pressure changes in a fluid in a closed chamber, comprising a high density of resistor segments gapped about 0.002 inches and conductors as contact pads which conductors are permanently affixed to a ceramic substrate is disclosed.

11 Claims, 6 Drawing Figures

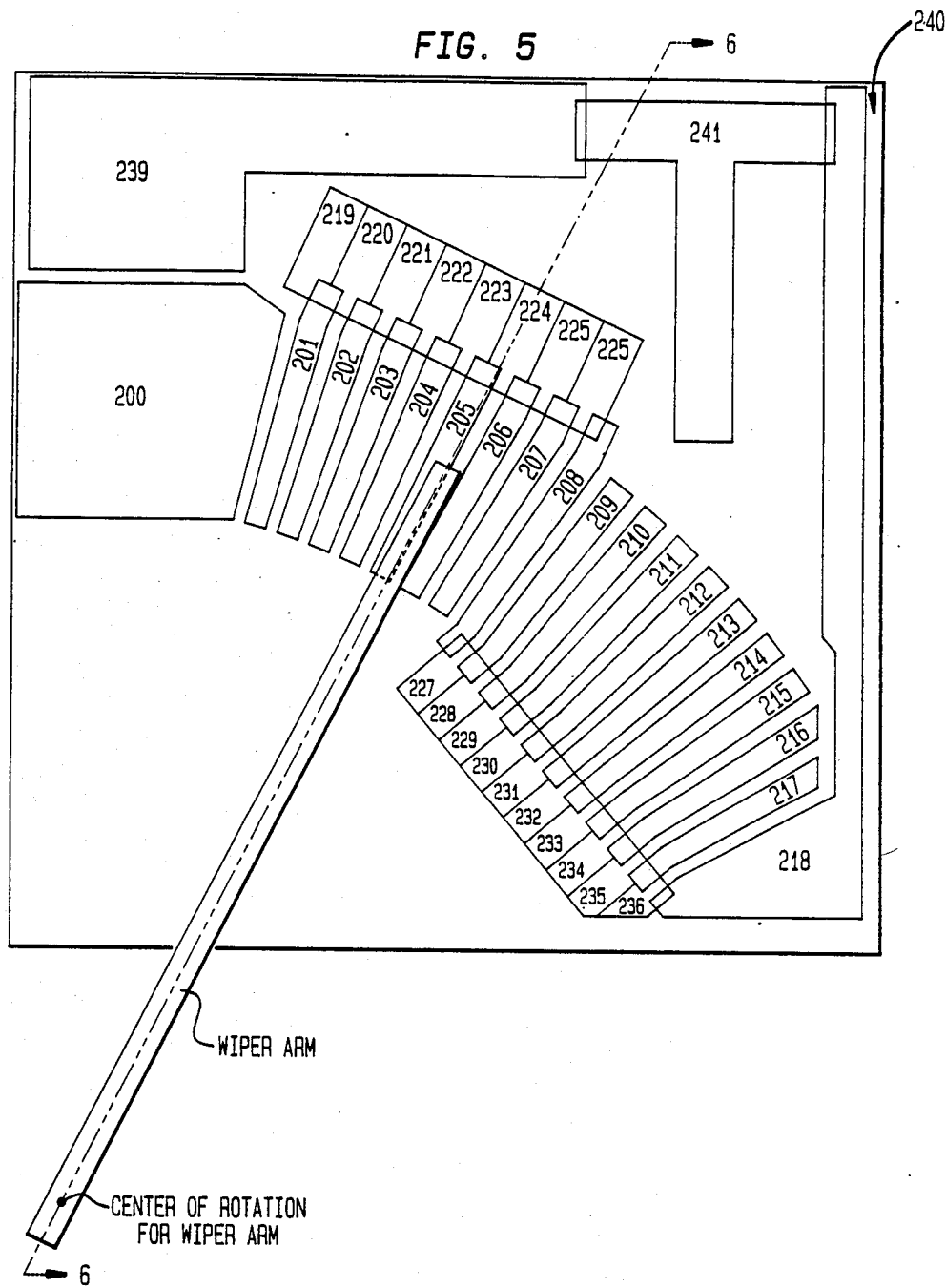

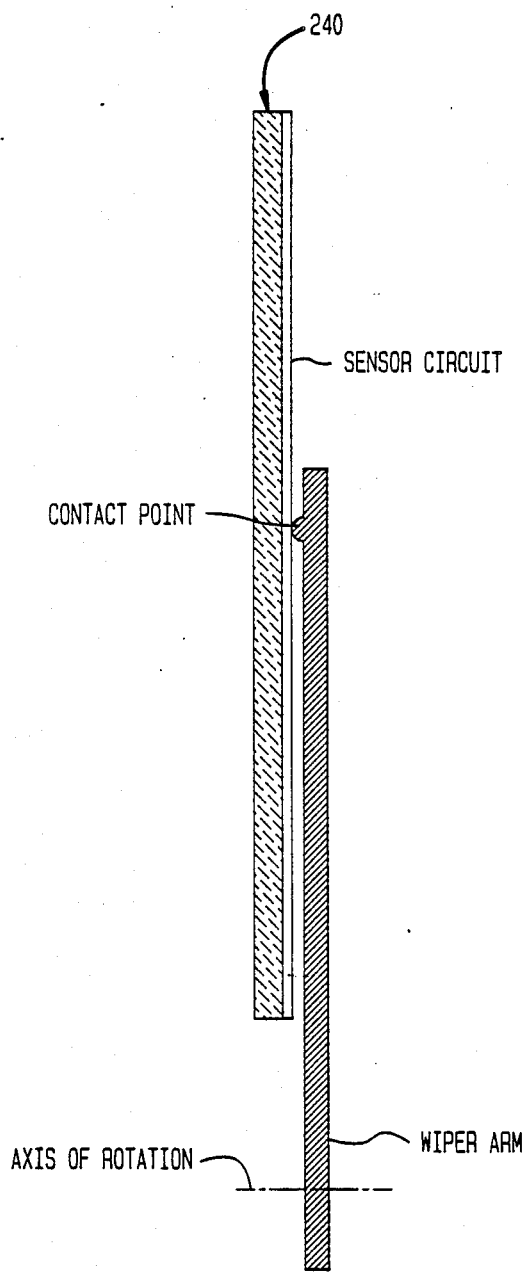

SENSOR CIRCUIT

BACKGROUND OF THE INVENTION

1. Field of the Invention

This invention relates to a high density miniature sensor circuit on a ceramic substrate. The circuit is used in combination with a wiper blade that passes over contact pads of the circuit and converts the position of the wiper arm to predetermined electrical resistance values. The sensor circuit can be used to record liquid pressures in a closed chamber, for example, to record the oil pressure in an automobile motor crankcase.

2. Prior Art

Existing circuits convert the position of a wiper arm to a predetermined resistance value by spacing the contact pads therein as close together as thick film technology allows. This is about 0.010 inches. Also the width of the contact pads is the minimum width that thick film technology permits. This is also about 0.010 inches. This is done to provide a maximum number of steps during movement of the wiper arm. In order to print and trim individual resistors between each contact pad, greater area is needed. This greater area is found by fanning the contact pads out away from the area where the wiper arm travels and putting the resistors in this larger area (at the far end of the contact pads). In accomplishing this, the conductors (contact pads) in the circuit are made long relative to the size of the substrate. The resistance in the conductor itself becomes significant and can exceed the allowable resistance change at a given step.

It is an object of this invention to provide a thick film conductor and resistor circuit capable of converting wiper arm position to a predetermined resistance value, which circuit has very small resistance changes pwer step. The conductors in the circuit also act as contact pads for the wiper arm blade.

Another object of this invention is to provide a thick film conductor and resistor circit that will withstand many cycles of wiper arm movement without wearing out.

Still another object of this invention is to provide a method for making the circuit so that there are very small distances between steps thereon, enabling the circuit to be placed on a very small area substrate.

BRIEF SUMMARY OF THE INVENTION

This invention provides a sensor circuit on a ceramic substrate for use with connecting means for applying an external source of potential comprising a wiper arm blade, wherein (a) the substrate is a ceramic material; (b) the circuit is comprised of conductors acting also as contact pads for the wiper arm blade and resistors in electrical contact therewith and with the connecting means, said conductors and resistors being permanently attached to said substrate, and a means for measuring pressure.

In a preferred embodiment, the pesent invention provides an electrical sensor circuit with resistors, contact pad conductors on a ceramic substrate and a connecting means for applying an external potential source comprising a wiper arm, which comprises:

(a) a substrate comprised of a ceramic material; and (b) a circuit permanently attached to said substrate comprising (i) connecting means for applying an external potential source comprising a wiper arm; (ii) conductors as contact pads for the wiper arm permanently attached to said ceramic substrate and in electrical attachment to said connecting means and said resistors; (iii) a high density of resistor segments gapped about 0.002 inches and being permanently attached to said substrate and in electrical attachment with said contact pads; (iv) a resistor connecting one of said connecting means and the first of said conpads; and (v) means for measuring resistance.

The invention also provides a method of preparing the circuit of this invention on the substrate using thick film technology modified to achieve the desired results. The contact pads (conductors) are made from a highly abrasive wear resistant thick film, normally palladium/-silver material, and can be soldered to external electrical leads. The abrasive wear resistance of the circuit results in significant lead electrical resistance.

The resistor material is also a thick film material, normally ruthenium-containing material, screen printed onto the ends of the contact pads then fired onto the substrate forming resistor areas. The resistor areas are then segmented and trimmed by means of a YAG(yttrium-aluminum-garnet) laser.

BRIEF DESCRIPTION OF THE DRAWINGS

FIG. 5 is a top plan view of a preferred embodiment of the circuit of this invention on a substrate; and FIG. 6 is a side sectional view along line 6—6 of FIG. 5 seen in the direction of the arrows.

DETAILED DESCRIPTION

While the invention will be described in connection with a preferred embodiment, it is to understood that it is not limited to the disclosed embodiments but is intended to cover various modifications and equivalent arrangements included within the spirit and scope of the appended claims.

Figure 1:
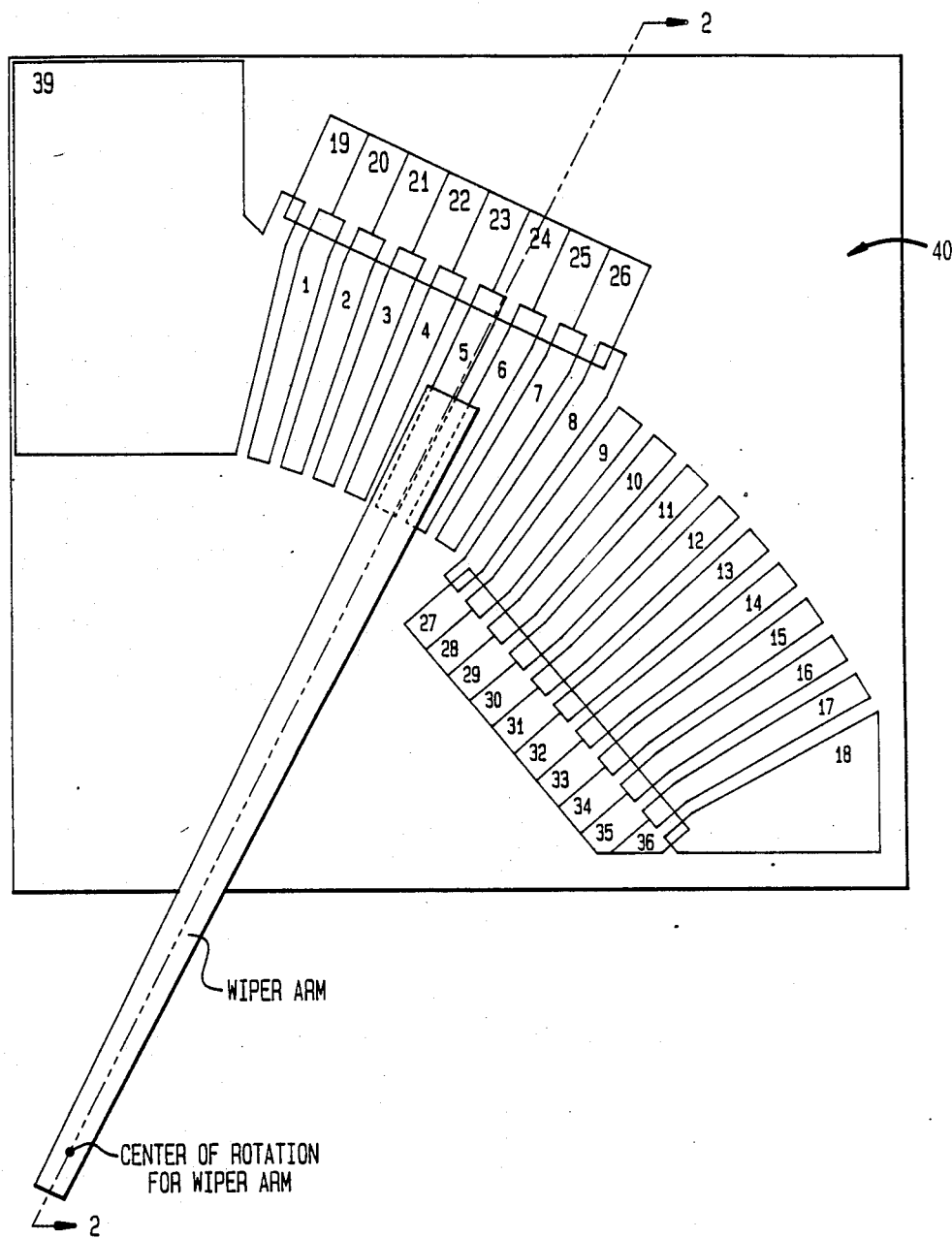
FIG. 1 is a top plan view of the circuit of this invention on a substrate.
Figure 2:
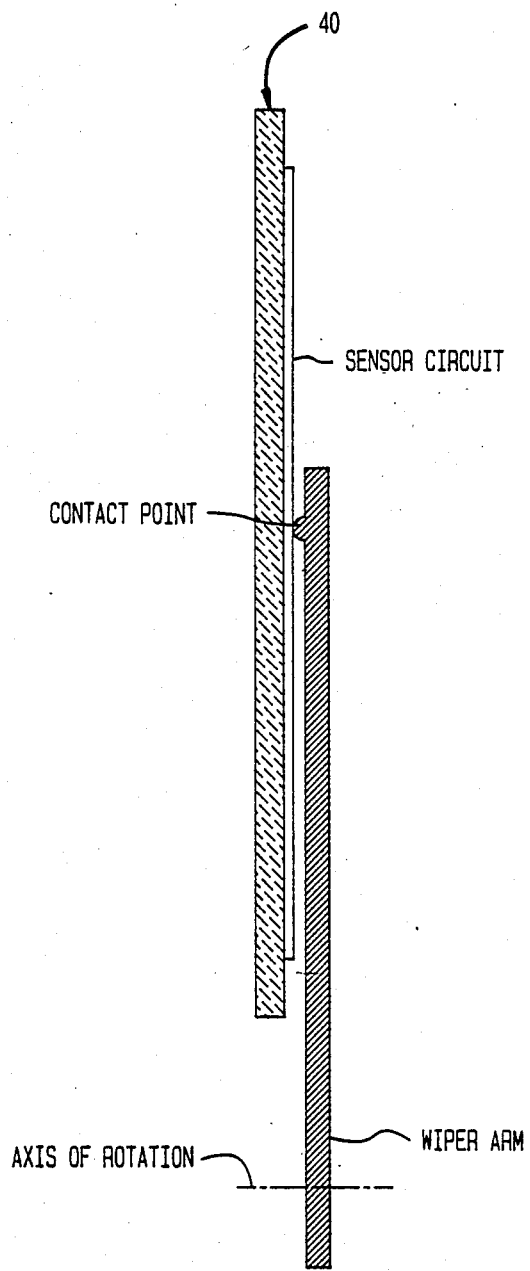
FIG. 2 is a side sectional view along line 2—2 of FIG. 1 seen in the direction of the arrows.
Figure 3:
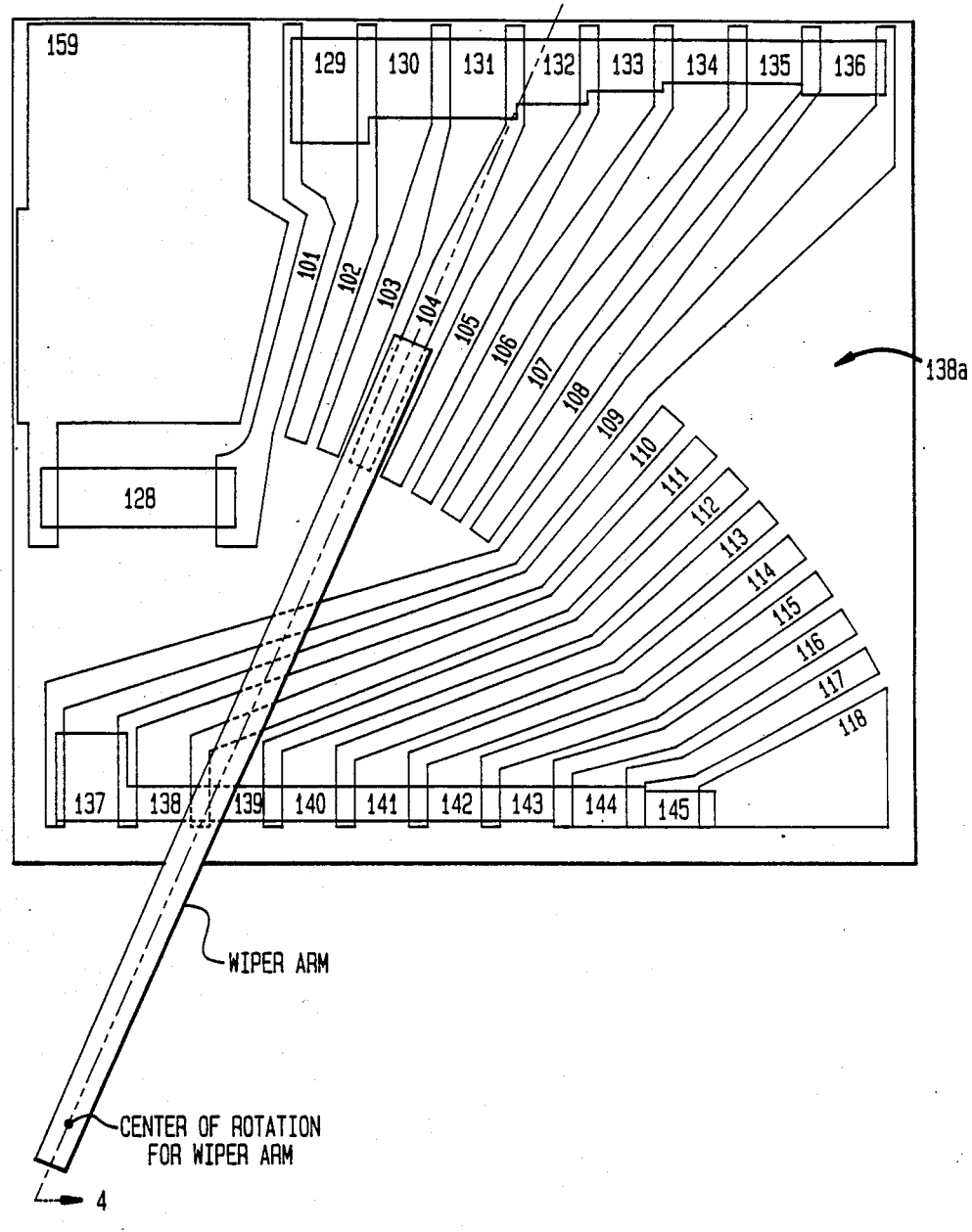
FIG. 3 is a top plan view of a prior art circuit on a substrate.
Figure 4:
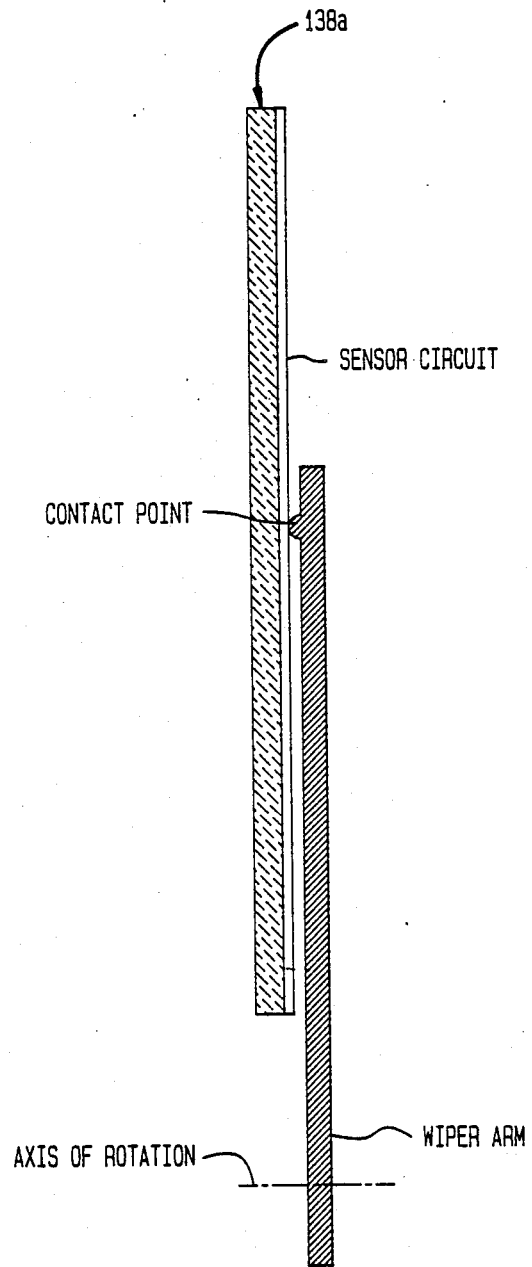
FIG. 4 is a side sectional view along line 4—4 of FIG. 3 seen in the direction of the arrows.

Turning to the drawings, in FIGS. 1 and 2 there is shown the circuit of this invention and in FIGS. 5 and 6 a preferred embodiment is shown. FIGS. 3 and 4 show a commercial prior art circuit.

The circuit of this invention is on a ceramic substrate 40 and the circuit of the prior art is on a ceramic substrate 138.

In FIG. 1, the shape of the substrate 40 is not critical to the invention, however, in its preferred embodiments as shown in FIG. 5, the substrate is generally rectangular in shape. Thick film technology is used to make the circuit. Thick film technology is the science of the formation of electrical high density miniature circuits on a supporting substrate. Film thicknesses are usually 10 micrometers or greater. Specially formulated resistor and conductor inks or pastes are applied as films to the ceramic substrates by screen-printing techniques. The films are dried after printing and thereafter fired in air at a precise time-temperature profile for about 15 minutes to about an hour at about 750°0 C. to 1000° C. Resistor and conductor pastes normally consist of finely divided conductive phase, a finely divided glass phase, resins, solvents and small amounts of surfactants and wetting agents, such as described in Hybrid Microcircuits by I. Pratt, pages 7-75 to 7-81 and Integrated Circuits and Microprocessors, pages 8-16 to 8-17, Electronics Engineers' Handbook, D. G. Fink Editor, McGraw Hill Co. (1982).

Typical suitable ceramic substrates include alumina, normally 96% $Al_2O_3$, single crystal $Al_2O_3$(sapphire), beryllia(BeO), glasses e.g. glass 7900(96% silica) as well as others such as ceramic-filled Teflon compounds and porcelain enamel steel; 96% alumina is preferred.

Typical suitable conductor compositions include noble metals such as Au, PtAu, PdAu, Ag, and PdAg. In addition, copper- and nickel-based paste compositions may be used but they require firing in inert or reducing atmosphere. PdAg pastes are preferred.

Typical suitable resistive components of resistor pastes include ruthenium oxide, palladium-palladium oxide-silver compositions, mixtures of precious metals, thallium oxide, tungsten-tungsten carbide or tantalum-tantalum oxide. A ruthenium based resistor paste, e.g. Engelhard Series 3000 is normally used. Most thick film resistors must be trimmed or converted to the specified value by use of yttrium-aluminum-garnet(YAG) lasers or carbon dioxide lasers with the associated electronic computer controls.

The circuit is composed of a ground 39 which is electrically attached to a thick film contact pad conductor 1 through a thick film resistor 19. The first contact pad 1 leads to the first resistor segment 20 of a resistor area. The contact pads and resistor areas are applied to the substrate by the silk-screen technique using fine mesh stainless steel screen such as described hereinabove. The thick film contact pads 1-18 and resistor areas 19-36 are dried, fired and then segmented, i.e. cut into individual resistors by use of a YAG laser. Normally the thick film resistors have lower than desired resistance but are thereafter trimmed to a final desired value by one or more cuts with a YAG laser. The segmenting is done from the portion of the resistor in contact with the contact pad end to form a brimless top hat resistor configuration; a configuration well known in the art. The resistors and the conductors are shaped so they are shorter than the prior art resistors and conductors in similar circuits relative to the size of the substrate.

The first resistor segment 19 connects the ground 39 to the to the first contact pad 1. Similarly, the second resistor segment 20 connects contact pads 1 and 2. This pattern is repeated throughout the eighteen contact pads to complete the circuit. Resistor segments 19 through 36 are formed by overlaying a thick film resistance material, e.g. Engelhard Series 3000, a ruthenium-containing material, over extended ends of the contact pads already on the substrate, then fired, segmented and trimmed.

To use the sensor circuit of the present invention to measure e.g. oil pressure in an automobile motor crankcase, a means for supplying an external potential and means for measuring the resistance is attached. The means for supplying an external potential comprises a wiper arm connected to one lead of a power source, e.g. a direct current battery which is then connected to the ground 39. A means for measuring resistance is also connected to the circuit. The wiper arm and the sensor substrate may be commonly supported by a base substrate, wherein the sensor substrate is bonded with epoxy or some other means in a fixed position. The wiper arm is attached so as to rotate about a fixed point by riveting or some other suitable means.

The shapes of the conductors and resistor aras are not critical to this invention, although generally rectangular shapes are preferred. The configuration of the circuit can be any convenient configuration, i.e. straight, circular, fan shaped, wavy and the like, with fan shaped being preferred, as shown in FIGS. 1 and 5. A critical aspect of the circuit is that the resistors be of sufficient height after segmenting into brimless top hat shaped resistors to permit trimming and the distances (gaps) between the resistor segments be sufficiently narrow to allow placement of the resistors immediately adjacent the wiper arm contact pads to minimumize lead resistance.

The resistor segments 19-36 are overlaid over an extension of the ground 39 and contact pads 1-18 inclusive in such a way that each resistor segment is in contact with two adjacent contact pads, for example, as seen in FIG. 1, resistor segment 32 is in electrical contact with contact pads 14 and 13 and contact pad 13, for example, is in electrical contact with resistor segments 31 and 32.

The contact pads are made of high abrasion resistant palladium/silver alloy thick film paste. The contact pads and resistor areas are permanently attached to the ceramic substrate as explained above and then the resistor areas are segmented so the gaps between the resulting resistor segments are 0.002 inches each which gap is much smaller than the prior art circuit shown in FIGS. 3 and 4 where it is clear that the resistor segments are formed with the contact pad circuit between them, for example, resistor segments 133 and 134 have contact pad 106 between them and the distance between the resistor areas is much longer than in the circuit of this invention, causing significant resistance in the contact pad conductors 101 through 118 and making it difficult to control the values of the resistance segments 128 through 145. Resistor 128 in FIG. 3 connects the ground lead 159 to the first contact pad 101.

A preferred embodiment of the circuit of this invention is shown in FIGS. 5 and 6. The circuit is composed of a ground 239 electrically connected to a top hat resistor 241 which in turn is electrically connected to a thick film contact pad conductor 218. In another less preferred embodiment of this invention (not shown), the brimless top hat resistor may be replaced by any resistor conveniently used in thick film circuits or it may be removed entirely so that the ground 239 is directly electrically connected to a contact pad conductor 218. The first resistor segment 236 is connected to the second contact pad 217 which in turn is connected to the second resistor segment 235 and the remaining resistor segments, i.e. 234 through 219 are respectively connected to the remaining contact pads 216 through 201. The resistor segments 219 through 236 and 241 as well as contact pads conductors 201 through 218 and ground 239 are permanently affixed to substrate 240 by the screen-printing method described hereinabove.

When a means for supplying an external potential and means for measuring the resistances are attached, the pressure is measured by the wiper arm which sweeps from right to left. The circuit shown in FIG. 5 is designed such that the resistance increases as the wiper arm moves from right to left. The circuit shown in FIG. 1 is designed such that the resistance increases as the wiper arm moves from left to right and the resistance decreases as the wiper moves from right to left, i.e. a direction reverse to that of the circuit described in FIG. 5.

A specific embodiment of the preparation of a circuit of this invention follows:

A ground pad and eighteen wiper arm contacts forming an arc of about 50° with a radius to the center of the contact pads of 0.500 inches are placed on a ceramic substrate made of 96% alumina by silk-screening, using thick film technology. The contact pads are made of high abrasion wear resistat palladium/silver alloy thick film paste and are silk-screened onto the ceramic substrate which is about 0.025 inches thick. The contact pads are about 0.010 inches wide and have 0.010 inch gaps between them. Small extensions are made onto the ends of the contact pads to make connection to the resistor area.

Resistor areas are placed adjacent to the contact areas and consist of thick film resistor material, e.g., ruthenium-containing material (Enlgehard Series 3000). The resistor areas are sufficiently long to cover all the extensions of the contact pads and are sufficiently wide to extend beyond the end of the contact pad extensions and allow appropriate trim to final values of at most about 2 Ohms. The resistor areas are segmented from the bottom, i.e. where they are on the end of each contact pad, into individual resistors using a YAG laser, forming a gap between segments of about 0.002 inches, which gap cannot be made by the prior art thick film technology as seen in FIGS. 3 and 4. The resulting densely packed group of resistor segments are trimmed to final value using a YAG laser, then the top hat resistor is trimmed to final value in the same way. The final resistance values are in the following table.

| Resistance Ohms | Resistor Segment |
|---|---|
| 1.00 | 19 |
| 1.25 | 20 |
| 1.50 | 21 |
| 1.50 | 22 |
| 0.75 | 23 |
| 2.25 | 24 |
| 1.25 | 25 |
| 1.25 | 26 |
| 1.25 | 27 |
| 1.25 | 28 |
| 1.25 | 29 |
| 1.25 | 30 |
| 1.00 | 31 |
| 1.50 | 32 |
| 0.75 | 33 |
| 0.75 | 34 |
| 0.75 | 35 |
| 0.75 | 36 |

In operation, when the circuit is used to monitor oil pressure in the crankcase of an automobile, for example, a wiper arm moving in response to the pressure of the oil in the crankcase sweeps continuously across the contact pads 1 through 18 depicted in FIG. 1. If a source of external potential, normally direct current, is applied across the ground and the wiper blade, the circuit converts the wiper arm position to a resistance value which can be correlated with crankcase pressure by use of a standard measuring device.

I claim:

1. An electrical sensor circuit with resistors, contact pad conductors on a ceramic substrate and a connecting means for applying an external potential source comprising a wiper arm, which comprises:
   (a) a substrate comprised of a ceramic material; and
   (b) a circuit permanently attached to said substrate comprising (i) connecting means for applying an external potential source comprising a wiper arm; (ii) conductors as contact pads for the wiper arm permanently attached to said ceramic substrate and in electrical attachment to said connecting means and said resistors; (iii) a high density of resistor segments gapped about 0.002 inches and being permanently attached to said substrate and in electrical attachment with said contact pads; and (iv) means for measuring resistance.

2. An electrical sensor circuit of claim 1 wherein the substrate is alumina and is about 0.025 inches thick.

3. A sensor circuit of claim 1 wherein the contact pads are high abrasion wear resistant palladium/silver alloy and are 0.010 inches wide with 0.010 inch gaps between them.

4. A sensor circit of claim 1 wherein the resistors comprise ruthenium-containing material of at most about 2 Ohm resistance.

5. A sensor circuit of claim 1 adapted for use in a fluid-containing closed chamber.

6. Aprocess of preparing the sensor circit of claim 1 which comprises placing a series of thick film wear resistant contact pads on a ceramic surface and overlaying on the contact pads, resistance areas wide enough to cover the ends of said contact pads; firing to fix the circuit on said substrate and thereafter segmenting the resistor areas to form gaps of 0.002 inches and trimming each resistor segment to a predetermined value with a YAG laser.

7. An electrical sensor circuit with resistors and contact pads on a ceramic substrate and a connecting means for applying an external potential source comprising a wiper arm, which comprises:
   (a) a substrate comprised of a ceramic material; and
   (b) a circuit permanently attached to said substrate comprising (i) connecting means for applying an external potential source comprising a wiper arm; (ii) conductors as contact pads for said wiper arm permanently attached to said connecting means and said resistors; (iii) a high density of resistor segments gapped about 0.002 inches and being permanently attached to said substrate and in electrical attachment with said contact pads; (iv) a resistor connecting one of said connecting means and the first of said contact pads; and (v) means for measuring resistance.

8. An electrical sensor circuit of claim 7 wherein the substrate is alumina and is about 0.025 inches thick.

9. A sensor circuit of claim 7 wherein the contact pads are high abrasion wear resistant palladium/silver alloy and are 0.010 inches wide with 0.010 inch gaps between them.

10. A sensor circuit of claim 7 wherein the resistors comprise ruthenium-containing material of at most about 2 Ohm resistance.

11. A sensor circuit of claim 7 adapted for use in a closed chamber containing fluid.

* * * * *